United States Patent [19]

Scalese et al.

[11] 3,831,084

[45] Aug. 20, 1974

[54] PROBE WITH MEANS FOR SELECTIVELY PERMITTING A STATIONARY OR A HELICAL SCAN

[76] Inventors: Joseph J. Scalese, 5531 Laird Way, Loomis, Calif. 95650; Albert F. Rogel, 2655 Ellenbrook Dr., Rancho Cordova, Calif. 95670

[22] Filed: Apr. 13, 1973

[21] Appl. No.: 350,856

[52] U.S. Cl. ................................................. 324/40
[51] Int. Cl. ............................................. G01r 33/12
[58] Field of Search ................................. 324/37, 40

[56] References Cited
UNITED STATES PATENTS
2,684,464  7/1954  Hastings et al. ...................... 324/37
3,718,855  2/1973  Rogel et al. ............................ 324/37

FOREIGN PATENTS OR APPLICATIONS
631,988  11/1949  Great Britain ........................ 324/40

Primary Examiner—Robert J. Corcoran
Attorney, Agent, or Firm—Harry A. Herbert, Jr.; Henry S. Miller

[57] ABSTRACT

A helically scanning eddy current flaw detector is disclosed having a housing capable of being affixed to a work piece, a motor and gear train to insert and withdraw the detector from a work piece. A controllable sleeve allows the detector to selectively either follow the helical path or rotate in place and limit switches are provided to change direction or stop the probe when it is run to its limit.

1 Claim, 1 Drawing Figure

PATENTED AUG 20 1974                    3,831,084
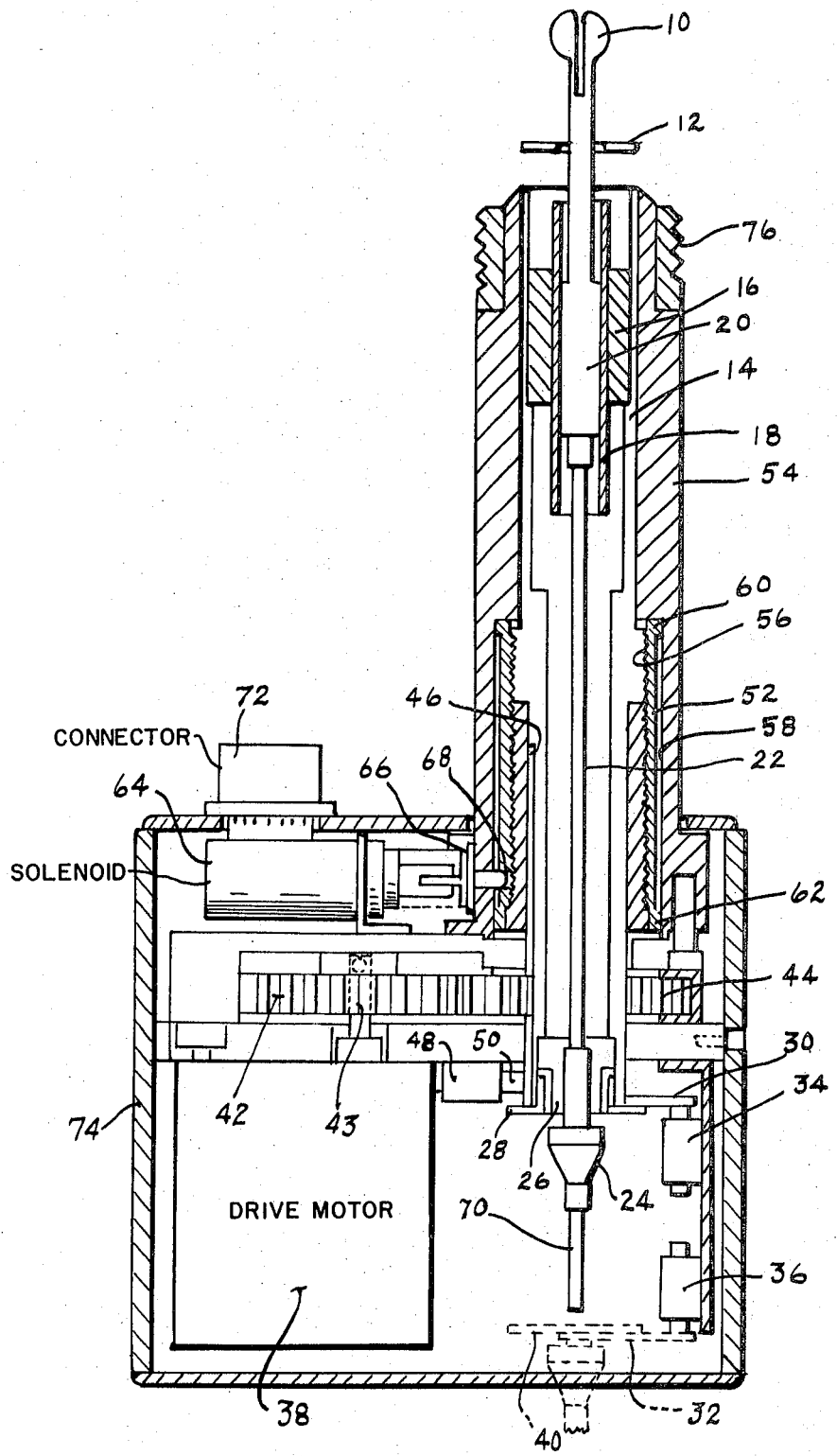

PROBE WITH MEANS FOR SELECTIVELY PERMITTING A STATIONARY OR A HELICAL SCAN

BRIEF SUMMARY OF THE INVENTION

This invention is an improvement of our Automatic Eddy Current Flaw Detection System, U.S. Pat. No. 3,718,855 issued Feb. 27, 1973 which is hereby incorporated by reference into this application for Letters Patent. The eddy current flaw detector consists of an eddy current probe held in a spindle which is rotatable within a spindle housing. The spindle housing is threaded externally at one end for engagement with a mounting bracket. The mounting bracket secures the detector to the work piece. A calibration disk is mounted in the bracked adjacent the end of the probe whereby the probe passes through an opening in the disk, permiting standardization of the probe and its electrical system prior to its entry in the work piece. The opposite end of the spindle is enclosed with a housing containing a drive motor and associated gearing to drive the spindle. A solenoid for effecting in place scanning of the probe and electrical connecting means for the detector and motor are likewise contained in the housing. The improvement is characterized by the addition of a threaded sleeve installed between the spindle and spindle housing. The internal thread of the sleeve is mated to the spindle thread to provide a linear rotational movement of the spindle and probe. As the spindle is rotated by the motor and gear drive, the probe follows a spiral path into or out of the work piece, dependent upon the direction of rotation.

The external surface of the sleeve has an undercut region extending nearly the entire length of the sleeve. At each end of the sleeve on the external surface is a narrow region forming a bearing surface which engages the internal surface of the spindle housing. At one end the sleeve has a series of openings mounted in a plane parallel to the bearing surface. An electro mechanical means, formed of a solenoid and plunger engages the sleeve to prevent rotation of the sleeve in the housing. When rotation of the eddy current probe in place is desired, the solenoid is activated removing the plunger from its engagement with the sleeve, thereby allowing the sleeve to rotate with the spindle.

A further improvement of the invention resides in the inclusion of limit microswitches which will reverse direction of drivemotor when the spindle has reached its extended limit of travel and cut off power to the drive motor when the withdrawal limit is reached.

The eddy current probe is electrically connected through a slip ring arrangement mounted in the spindle which allows for rotation without tangling wires in the housing.

It is therefore an object of the invention to provide a new and improved automatic eddy current flaw detector.

It is another object of the invention to provide a new and improved automatic eddy current flaw detector that will both scan in a spiral path and scan in place.

It is a further object of the invention to provide a new and improved eddy current flaw detector that provides means for automatically withdrawing the eddy current probe.

These and other advantages, features and objects of the invention will become more apparent from the following description taken in connection with the illustrative embodiment in the accompanying drawing.

DESCRIPTION OF THE DRAWINGS

The FIGURE is a side elevational view, partly in section, of the invention.

DESCRIPTION OF THE PREFERRED EMBODIMENT

Referring now to the FIGURE, the eddy current probe having a split head is shown at 10 and the calibration disk at 12. The calibration disk is normally positioned in the mounting bracket which is not shown. The probe is secured in the spindle 14 by a probe holder consisting of a nylon plug 16 and a tube 18 to fit the hole probe shank 20, and also permit the probe to be withdrawn from the tube without damage to the delicate probe connector. The probe is connected to a probe extender 22 which contains the electrical leads for the probe and extends through the center of the spindle 14. The probe extender has affixed to it a slip ring assembly 24, to allow the probe to turn without the twisting of electrical leads. The slip ring is held in position by a holder 26 made from rubber or other suitable material.

The spindle terminates in a flange 28 which is adopted to engage the arms 30, 32 of the limit microswitches 34 and 36. In operation, as the flange 28 trips switch 34, the drive motor 38 reverses direction until the flange reaches the position 40 shown in phantom and trips the switch 36 cutting off current to the motor.

The motor 38 is connected to the spindle 14 via a pair of gears 42, 44 which turn the spindle at a selected rate between 0 and 40 revolutions per minute. The gear 44 contains a key machined into its inner opening which rides in an elongated key way 46 on the outer spindle surface. The gear 42 is mounted on the motor shaft 43. For purposes of noting a revolution of the spindle a normally open microswitch 48 is mounted adjacent the motor 38. The switch has a roller follower that rides the outer surface of the spindle and is closed each time the roller drops into key way 46.

A sleeve 52 is positioned between the spindle 14 and the spindle housing 54. The internal surface of the sleeve is threaded and engages the threaded portion of the spindle 56. The exterior surface of the sleeve is undercut at 58. However, the end portions 60, 62 of the external surface of the sleeve are machined and act as bearing surfaces against the spindle housing 54. A solenoid 64 is mounted in the housing and controls a plunger 66. The plunger is biased toward the sleeve 52 and engages an opening 68 in the wall of the sleeve to prevent rotational movement thereof.

Upon activation of the solenoid, the plunger moves away from the sleeve and allows it to rotate with the spindle. The coefficient of friction between the threads of the spindle and those of the sleeve cause the probe to turn in place when the sleeve rotates with the spindle.

Leads 70 connect the slip ring assembly 24 to the eddy current instrument. This also connects the flaw detector (scanner) with the entire flaw detection system. The connector 72 contains plugs for all functions of the scanner. In operation, a lead connects the scanner with a control unit in the detector system.

A housing 74 encloses the entire operating portions of the detector to keep these parts free from contaminants and make the detector easier to handle. The housing is affixed to the spindle housing. Further, the spindle housing is threaded at one end 76 to allow it to engage the mounting bracket during operation.

It should be understood, of course, that the foregoing disclosure relates to only a preferred embodiment of the invention and that numerous modifications or alterations may be made therein without departing from the spirit and scope of the invention as set forth in the appended claims.

We claim:

1. An automatic eddy current flaw detector comprising in combination: a spindle housing: a spindle, externally threaded, mounted within the spindle housing: a rotatable sleeve internally threaded and adopted to engage the externally threaded spindle and having a plurality of regularly spaced apertures at one end, positioned between the spindle and spindle housing; and in a sliding relationship with the spindle housing, an eddy current probe mounted within the spindle; extension means affixed to one end of the probe; a slip ring assembly affixed to the probe extension for making electrical connection thereto; a solenoid operated plunger affixed to the spindle housing for selectively engaging the said apertures in the rotatable sleeve to control rotation of the sleeve; a drive motor, a gear system connecting the motor to the spindle, and an enclosure means affixed to the spindle housing for covering the drive motor and gear system.

* * * * *